(12) United States Patent
Hanson

(10) Patent No.: US 11,291,962 B2
(45) Date of Patent: Apr. 5, 2022

(54) FOOD CHILLING APPARATUS

(71) Applicant: James V. Hanson, Powell, OH (US)

(72) Inventor: James V. Hanson, Powell, OH (US)

(*) Notice: Subject to any disclaimer, the term of this patent is extended or adjusted under 35 U.S.C. 154(b) by 234 days.

(21) Appl. No.: 16/575,933

(22) Filed: Sep. 19, 2019

(65) Prior Publication Data

US 2020/0094204 A1     Mar. 26, 2020

Related U.S. Application Data

(60) Provisional application No. 62/733,680, filed on Sep. 20, 2018.

(51) Int. Cl.
*B01F 9/10* (2006.01)
*B01F 11/00* (2006.01)
*B01F 15/06* (2006.01)

(52) U.S. Cl.
CPC .......... *B01F 9/103* (2013.01); *B01F 11/0094* (2013.01); *B01F 15/065* (2013.01); *B01F 2015/061* (2013.01); *B01F 2215/0014* (2013.01)

(58) Field of Classification Search
CPC ........ B01F 9/103; B01F 9/106; B01F 15/065; A23G 9/10; A23G 9/106; A23G 9/225
See application file for complete search history.

(56) References Cited

U.S. PATENT DOCUMENTS

| | | | | |
|---|---|---|---|---|
| 2,240,641 | A * | 5/1941 | Dummler | A23G 9/106 62/346 |
| 4,403,867 | A * | 9/1983 | Duke | B01F 9/12 101/DIG. 34 |
| 6,595,680 | B2 * | 7/2003 | Sanpei | A47J 43/04 366/147 |

* cited by examiner

*Primary Examiner* — Elizabeth Insler
(74) *Attorney, Agent, or Firm* — Kegler Brown Hill + Ritter LPA Co.; Lorraine Hernandez

(57) ABSTRACT

A food chilling apparatus for rapidly decreasing the temperature of liquid and semiliquid cooked foods. The food chilling apparatus having a stand portion, a base portion, and a pot portion. The stand portion having a motor, an attachment portion, and a vertical structural member. The base portion having a baseplate, an output shaft, and a cradle, wherein the pot portion is removably attached to the cradle. The food chilling apparatus further comprising a paddle.

13 Claims, 10 Drawing Sheets

FOOD CHILLING APPARATUS

This non-provisional application claims priority to and the benefit of U.S. Provisional Application No. 62/733,680, filed on Sep. 20, 2018, herein incorporated by reference.

BACKGROUND

Chilling or cooling cooked liquid foods, such as soups, should be done as quickly as possible in order to reduce or eliminate bacterial or fungal growth. Leaving cooked food out too long at room temperature may cause bacteria to grow to dangerous levels, which in turn, may result in illness. Bacteria grow most rapidly between the range of 4° C. to 60° C. (40° F. to 140° F.). Said range is commonly known as the "danger zone." Bacteria may grow twice in number in as little as 20 minutes if the temperature is in the danger zone range.

Foodservice operations struggle to cool down the temperature of their cooked foods quickly enough to avoid deterioration and contamination. One of the problems faced by many foodservice operations is chilling large amounts of cooked liquid, as this requires a large amount of energy to do. A prior solution to this problem is the use of a blast chiller or freezer. However, blast chillers or blast freezers are expensive, bulky, noisy and unpractical for use with cooked liquid or semi liquid products. Most of these devices use a mechanical cooling compressor driven refrigeration system, and require pans not conducive for containment of liquids or semi liquids.

Frozen sticks, similar to ice cubes, have been previously used to reduce the temperature of cooked liquids. Frozen sticks are dropped into the hot liquid to lower the temperature of the same. However, the use of these frozen sticks can be cumbersome, as they need to be constantly cleaned and chilled prior to every use, which may increase the risk of cross-contamination. Moreover, the use of frozen sticks may result in inconsistent temperatures.

It has also been suggested to place a cooking pan in an ice bath to lower the temperature of cooked products. However, this method may also result in inconsistent temperatures throughout the cooked liquid. Furthermore, this method may be too slow to cool down large amounts of cooked liquid; thus, not feasible to meet health code regulations.

Moreover, food operations must monitor and log the time taken to reduce the temperature of a cooked liquid. If the time taken to cool down the cooked liquid is too long, the product must be discarded. Therefore, there is a need in the art for a reliable, non-bulky and economical apparatus for quick and consistent chilling of cooked liquids and semi-liquids.

SUMMARY AND DESCRIPTION OF THE INVENTION

Currently disclosed is an apparatus that provides for the placement of a pot of liquid or semi liquid cooked product in a spinner, the spinner being located in a sink filled with ice water. The spinner agitates the liquid, allowing for the quick cooling of the liquid or semi-liquid product.

The disclosed invention provides for the cooling of cooked liquid or semi-liquid food from a cooking temperature of approximately 180-200° F. (80-93° C.) to a safe zone of under 40° F. As previously indicated, the critical temperature or danger zone is between 40° F. to 140° F. The less time the cooked liquid spends in the danger zone, the safer it is and the longer shelf life it has.

Currently disclosed is a food chilling apparatus, comprising: a stand portion, a base portion, and a pot portion. The stand portion comprising a motor, an attachment portion, and a vertical structural member, where a paddle portion is attached to the attachment portion. The base portion may comprise a baseplate, an output shaft, and a cradle, wherein the pot portion is removably attached to the cradle.

The paddle portion may extend into the pot portion. The output shaft is capable of rotating the cradle and the pot portion, and the paddle portion stays stationary relative to the rotation of the pot portion. The paddle portion may rotate around the attachment portion and further comprises at least two arms extending into the pot portion. The paddle portion may be removably attached to the attachment portion. The output shaft may rotate on a rotational axis approximately perpendicular to the baseplate.

The cradle may further comprise at least three arms, each arm including at least two grip portions made of a material capable of gripping the pot portion. The pot portion may be capable of precession around a fixed rotational axis.

The food chilling apparatus may further comprise a sink portion capable of containing a liquid. Said liquid may be comprised of water and ice and have a temperature lower than 50° F. The stand portion, base portion, and pot portion of the food chilling apparatus may be at least partially inside the sink portion and the base portion and the cradle may be completely submerged in the liquid.

Further disclosed is a food chilling apparatus, comprising a stand portion, a base portion, and a pot portion. The stand portion comprising a motor, an attachment portion, and a vertical structural member. A paddle portion may be attached to the attachment portion. The base portion may comprise a baseplate, an output shaft, and a cradle. The pot portion may be removably attached to the cradle and the paddle portion may extend into the pot portion. The pot portion may be cylindrically shaped.

The output shaft may be capable of displacing the cradle and the pot portion. Further, the output shaft may be capable of displacing the cradle in a motion around a constant rotational axis. Alternatively, the output shaft may be capable of displacing the cradle in a vibratory motion. The motor may be located on one end of the vertical structural member. Moreover, the output shaft may be capable of precession around a constant rotational axis.

DETAILED DESCRIPTION OF THE DRAWINGS

Figure 1:
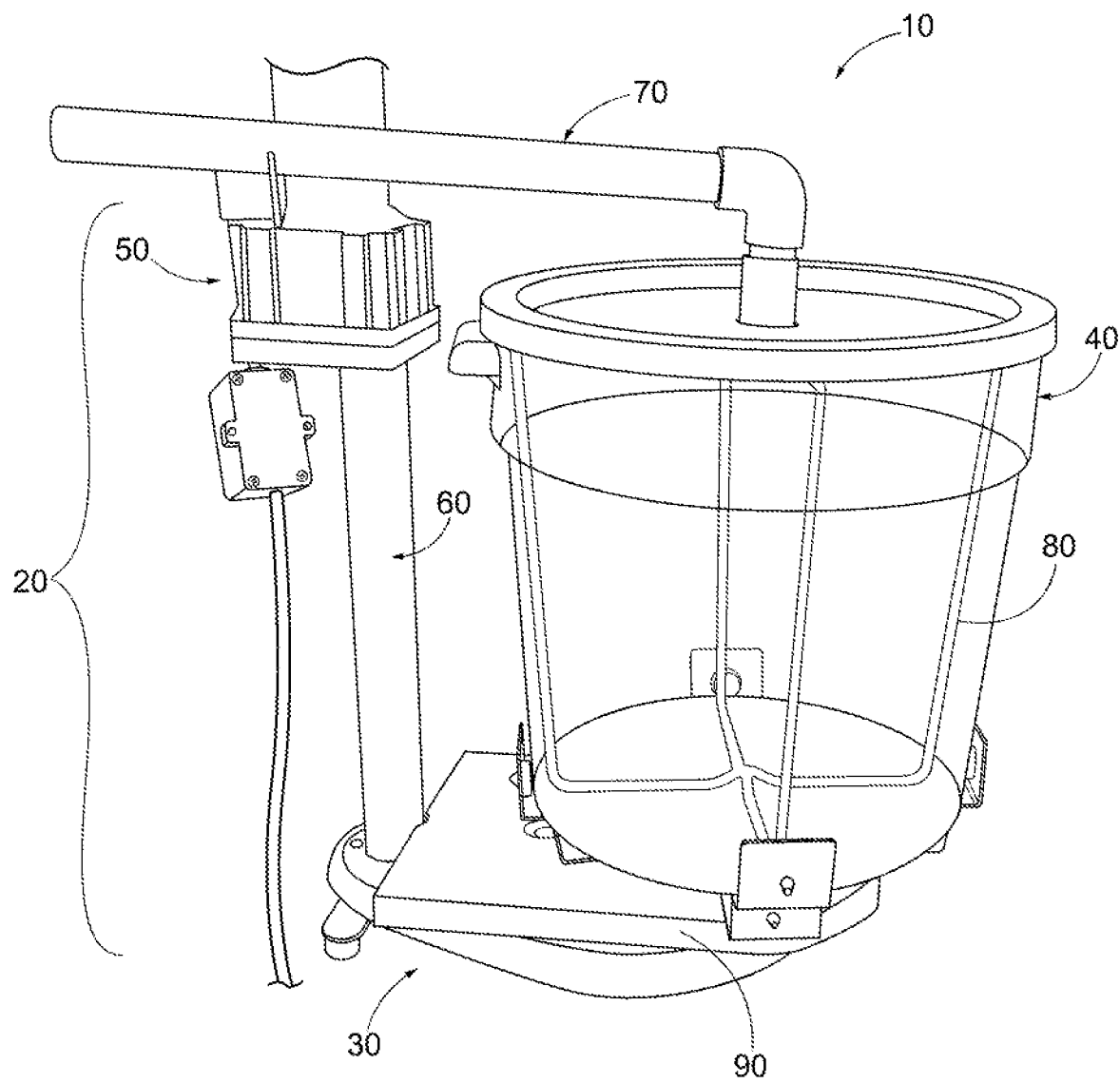
FIG. 1 depicts a chilling apparatus.
Figure 2:
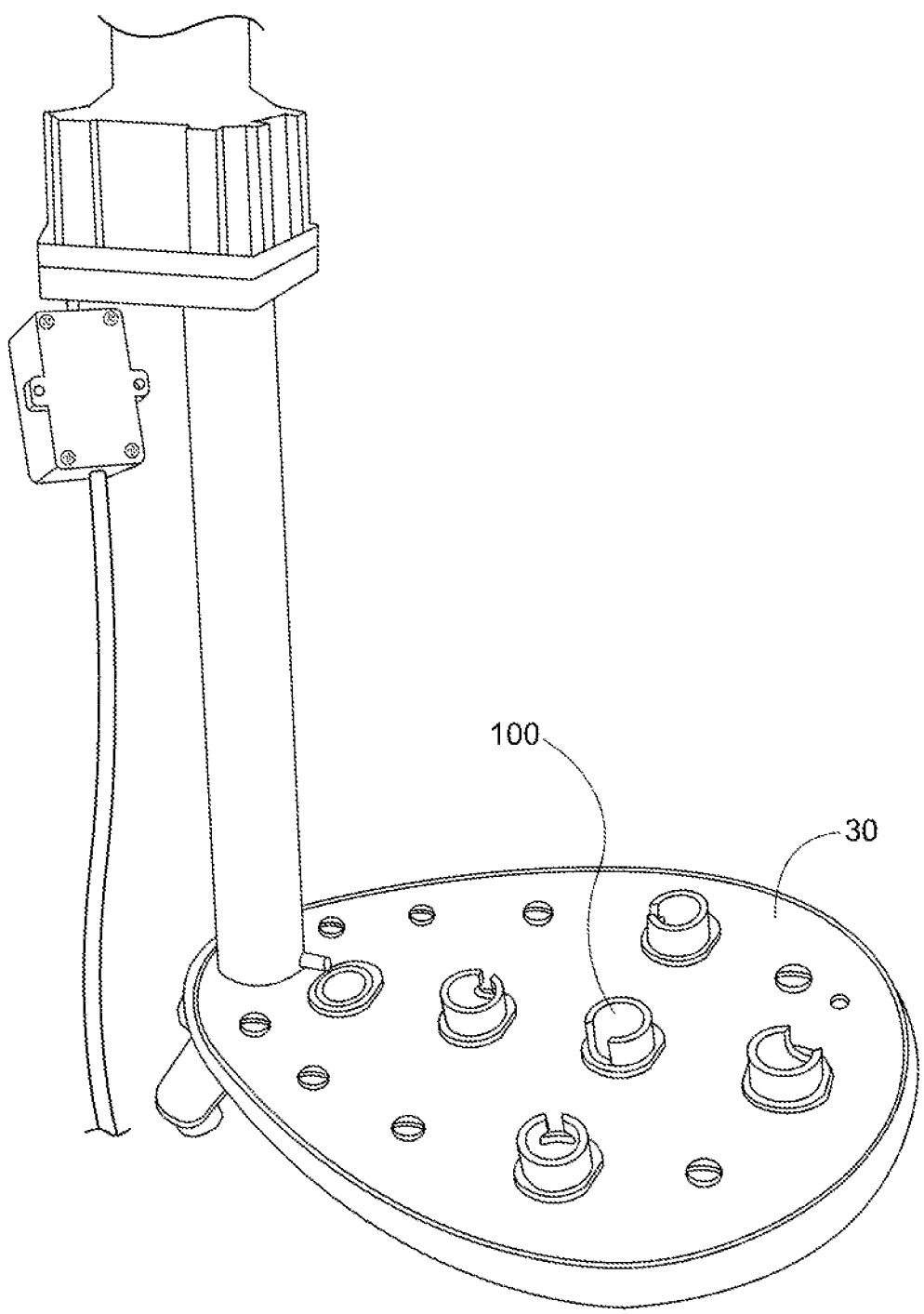
FIG. 2 depicts a base portion and stand portion of a chilling apparatus.
Figure 3:
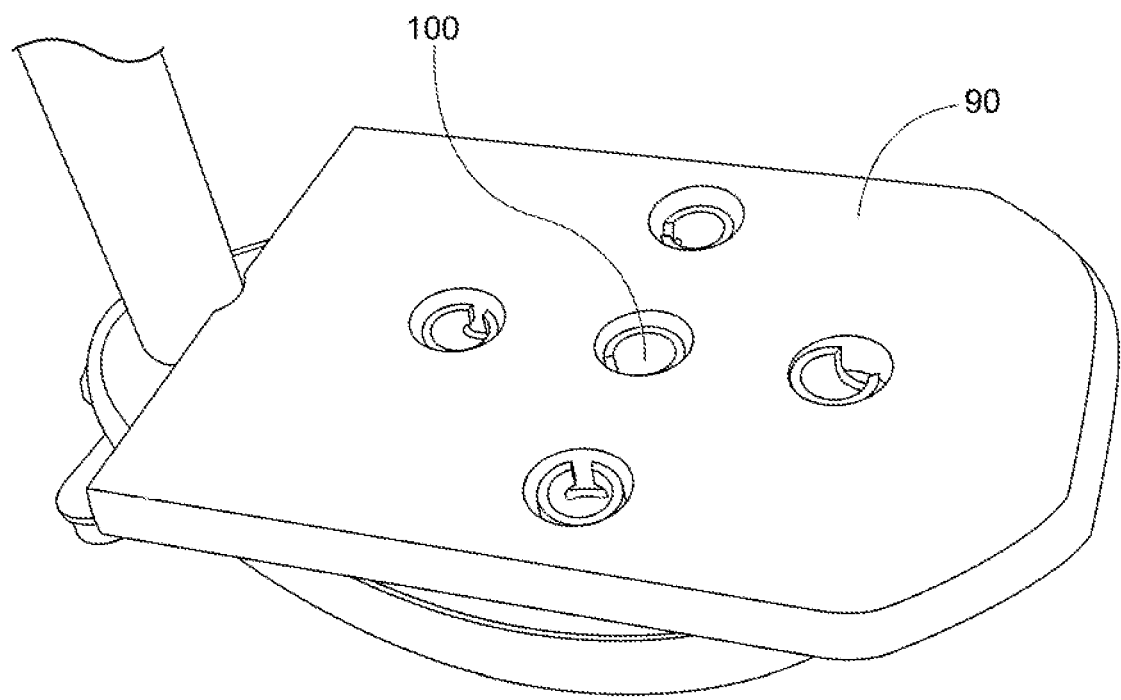
FIG. 3 depicts a base portion of a chilling apparatus.
Figure 4:
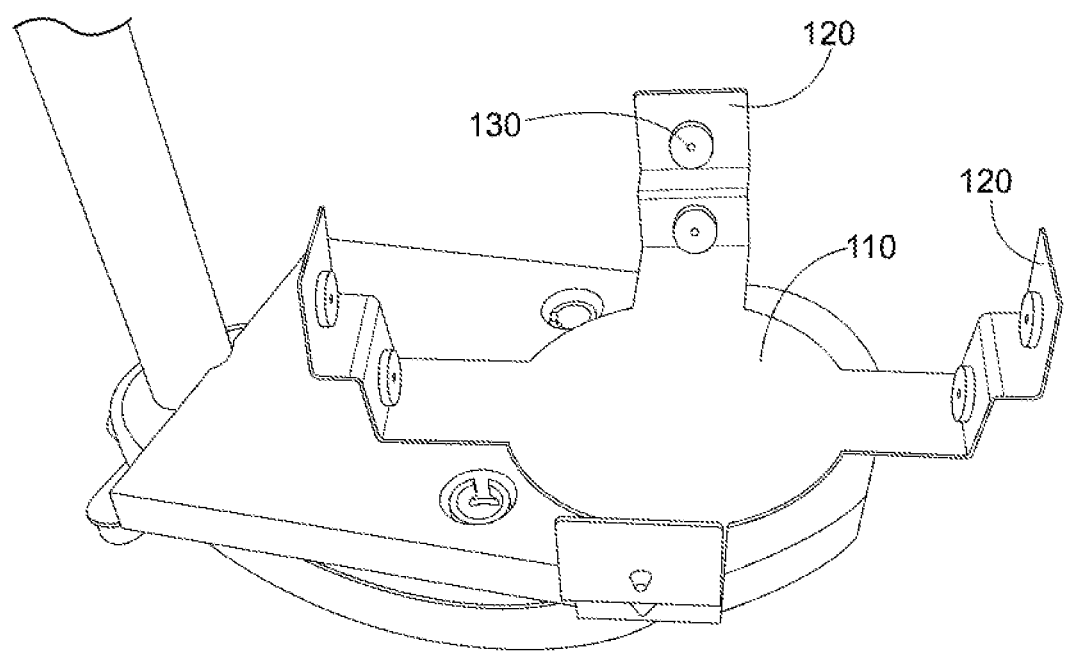
FIG. 4 illustrates a base portion and cradle of a chilling apparatus.
Figure 5:
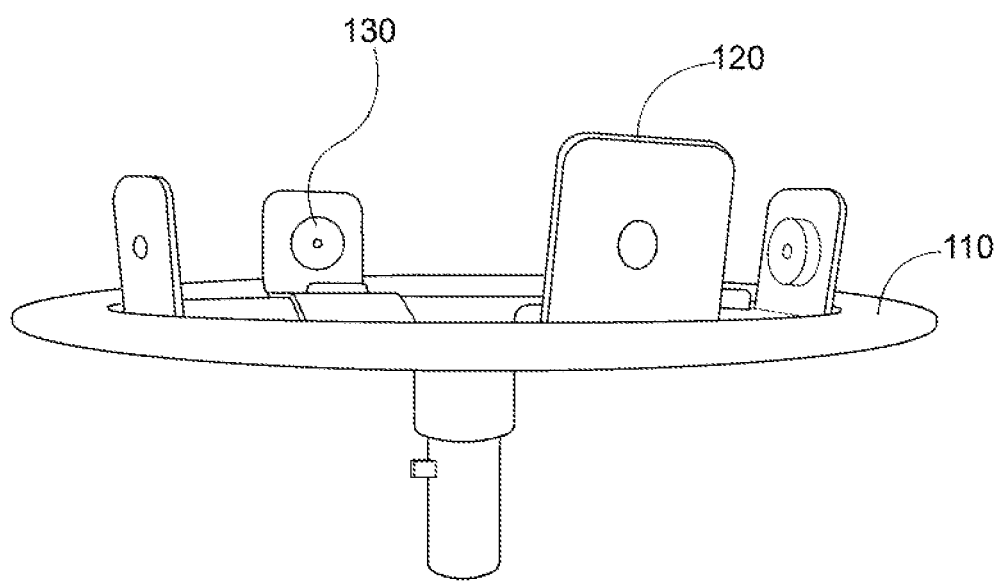
FIG. 5 illustrates a cradle of a chilling apparatus.

FIGS. 1 to 10 illustrate the currently claimed invention. Referring now to FIGS. 1-8, a liquid food chilling apparatus 10 is shown with a stand portion 20, a base portion 30, and a pot portion 40. The stand portion 20 comprises a motor 50, a vertical structural member 60, and an attachment portion 70. A paddle portion 80 may be removably attached to the attachment portion 70. The paddle portion may stay stationary in reference to the attachment portion. Alternatively, the paddle portion may rotate around the attachment portion. The paddle portion may stay stationary relatively to the pot portion. Alternatively, the paddle portion may rotate at the same time the pot portion is rotating.

FIGS. 2-8 further illustrate base portion 30 comprising baseplate 90, at least one output shaft 100, and cradle 110. The motor 50 rotates a drive shaft (not shown), which is placed inside the vertical structural member 60. The drive shaft rotates a pulley system attached to an output shaft 100. The output shaft 100 extends through platform or base portion 30 and connects to the cradle 110. Additionally, the output shaft 100 may extend through platform or base portion 30 and thought the baseplate 90 and connect to the cradle 110. The output shaft 100 rotates the cradle 110. The cradle 110 may comprise at least three arms 120. Said arms 120 hold the pot portion 40 in place. The cradle's arms 120 may further comprise rubberized portions 130, which make contact with the pot portion 40. The rubberized portions 130 hold the pot portion 40 in place and grip the pot portion to ensure rotation is consistent.

Figure 6:
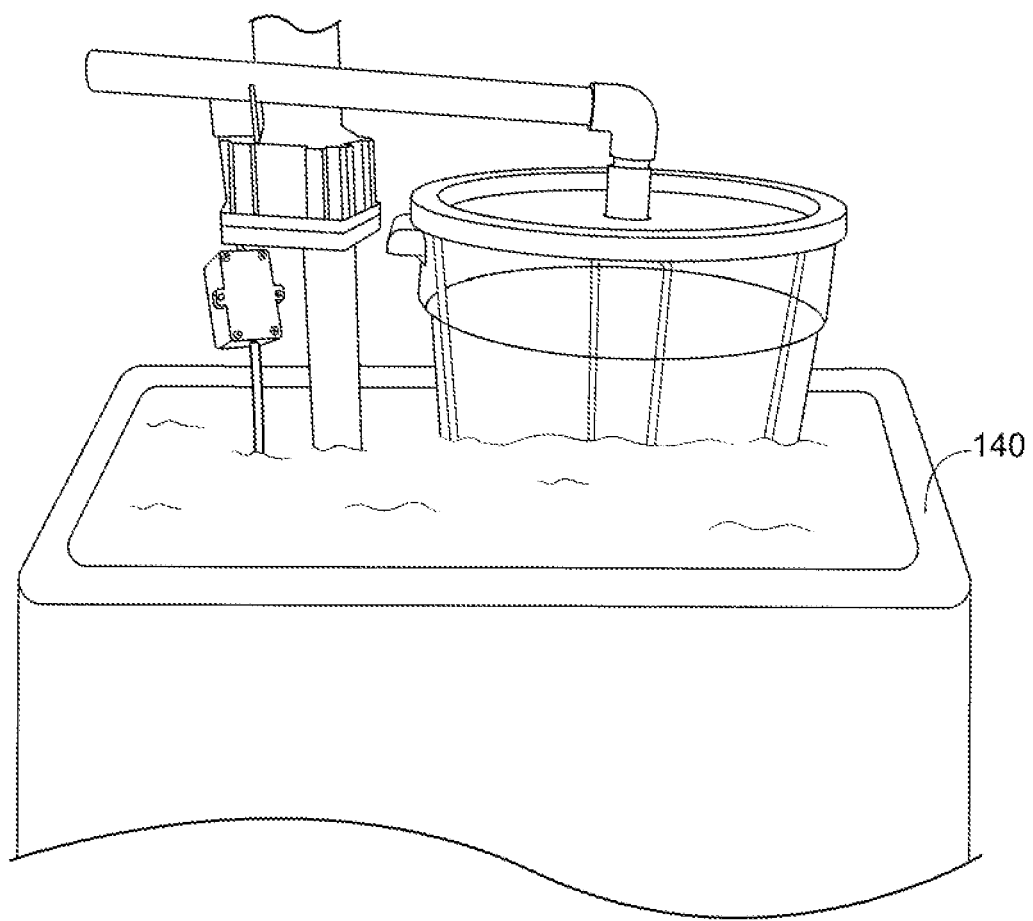
FIG. 6 depicts a submerged chilling apparatus.
Figure 7:
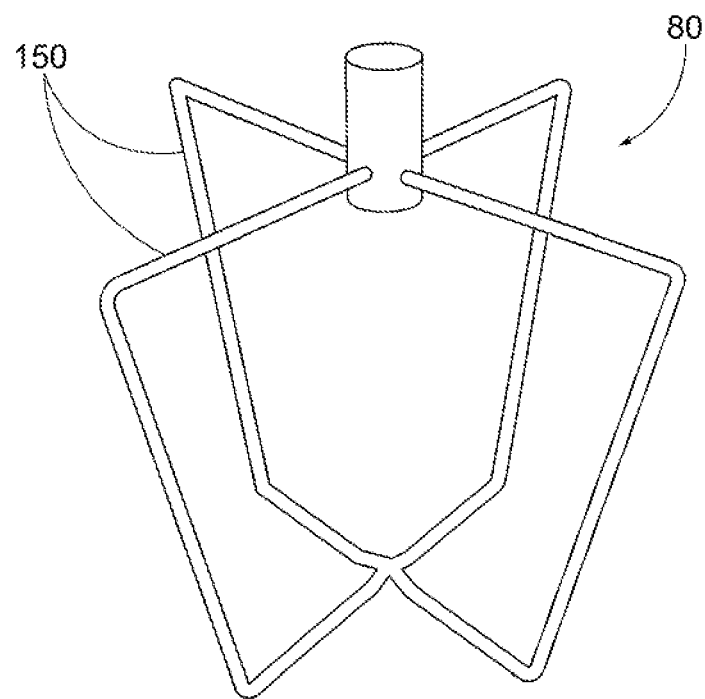
FIG. 7 illustrates a paddle portion of a chilling apparatus.

Base portion 30 is a submersible motorized base unit. As illustrated in FIG. 6, the motorized base unit sits in a sink or vessel 140 with icy water. Cradle 110 sits on top of baseplate 90 attaching to the base portion 30 through the output shaft 100. A pot of hot cooked liquid sits on the platform and a stirring paddle is inserted in the pot. The motorized base unit spins the platform in a rotational manner, causing the pot to also spin. Alternatively, or additionally, the motorized base unit spins the cradle and/or the cradle and baseplate in a rotational manner, causing the pot to also spin. The stirring paddle may stay stationary relative to the spinning pot of hot liquid. The combination of the stationary stirring paddle and the rotating pot causes the liquid to agitate. Side portions of the pot are in direct contact with the icy water, lowering the temperate of the liquid in contact with the sides of the pot. The agitation ensures the hot liquid continues to stay in contact with the side portions.

The sink or large ice bath vessel is prepared with cold water and ice, for example approximately 50 lbs. of ice per 12 qts. of food product to be chilled. The chilling apparatus is submerged into the ice water vessel keeping the motor above the water level. The chilling apparatus is then plugged into an outlet. The cradle is placed into the center open socket located in the platform. Alternatively, or additionally, the cradle is placed on top of the baseplate and into the center open socket located in the platform. Said open socket may include the output shaft. The cooked food is placed or poured into the pot portion. The pot portion is then placed top of the spinning baseplate and/or cradle resulting in the pot portion being partially submerged in the icy water. The paddle is placed into the pot. Further, a paddle stabilizing bar 160 may be attached to the paddle. The pot is centered and leveled as it spins. The ice level may be periodically checked. When food temperature reaches under 45° F., the pot is removed from the unit and placed into cold storage.

The platform and/or cradle may rotate at a uniform speed or a variable speed over time. The rotation is fast enough to enhance heat transfer from the pot to the icy water, but slow enough to not cause the food product to spill out of the pot, either from excess deflect against the stir paddle or other means. The platform, cradle, and spinning mechanism may be made of materials that are safely submersible in water.

The platform may allow a food safe pot to be attached or set on to it that it will spin freely in the icy water. The spinning platform can be powered either by electric motor or mechanical crank. The pot may be a food safe food pot, and in certain embodiments may be a round pot.

Figure 8:
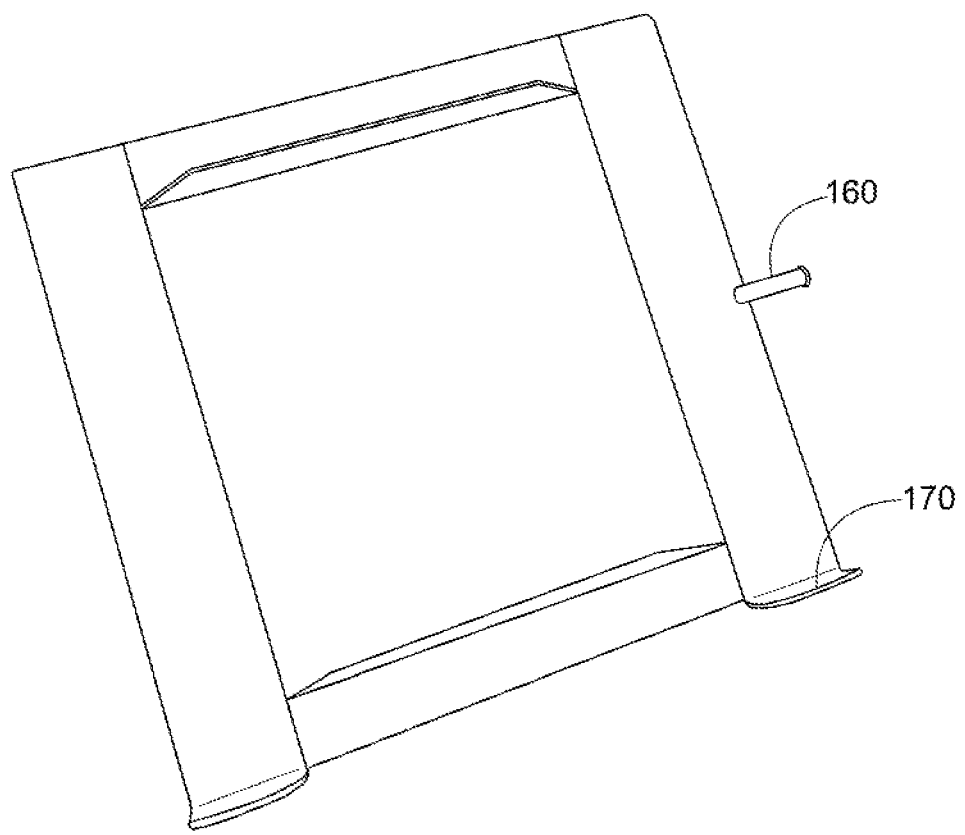
FIG. 8 illustrates a paddle portion of a chilling apparatus.
Figure 9:
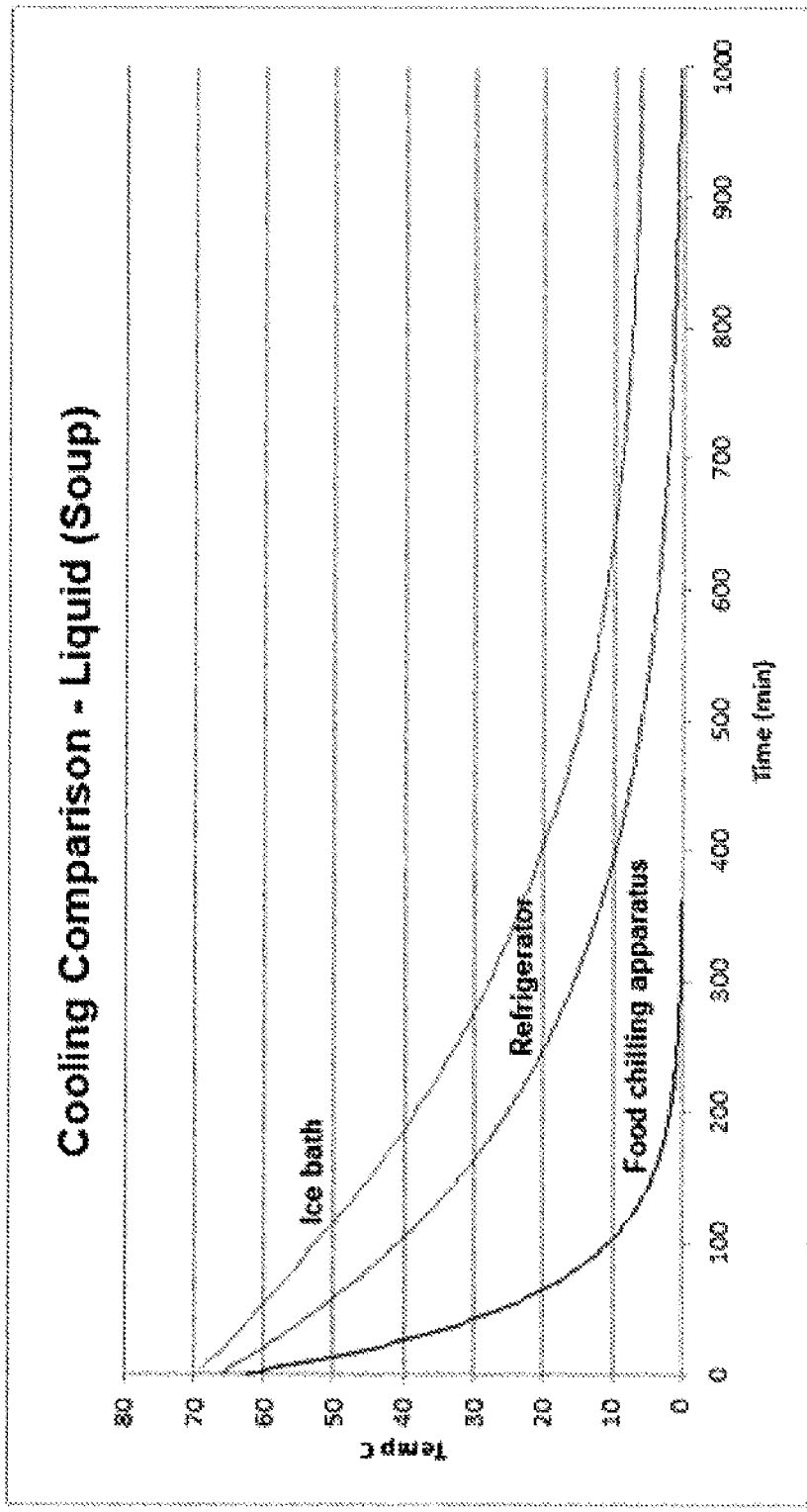
FIG. 9 illustrates cooling comparison tests for a liquid food.

As indicated above, a stirring paddle is placed inside the pot portion. The paddle may stay stationary relative to the spinning pot of hot liquid. FIGS. 8-9 illustrate types of spinning paddles. The paddle may comprise rounded arms 150. Alternatively, the paddle may comprise flat arms with fins 170 that allow the food product to churn while the pot spins. The flat paddle may be just slightly less width across than the diameter of the pot. The flat paddle may stand upright and the flat paddle may have a nub on the bottom to facilitate the ban spinning. In one embodiment, a stabilizing arm 160 may be attached to the bottom of the paddle. The stabilizing arm 160 stabilizes the paddle in one place while the pot of product spins around it. The stabilizing arm may include an attached food thermometer. The thermometer is submerged into the cooked liquid allowing constant uninterrupted monitoring of the temperature of the cooked liquid.

The device may be placed into a pre-existing sink, and may be removable from the sink when not in use. In one embodiment, the unit may be a permanent spinning mechanism. In another embodiment, the unit may be mounted under the sink using a waterproof shaft or using a magnetic clutch device.

The size and shape of the pot or pan used may vary. In a preferred embodiment, the pot is a round pot, such as a stockpot. The stir paddle enhances the speed of heat transfer, although the stir paddle may not be necessary for the spinning device to function. In one embodiment, the water may be chilled by a stand alone mechanical system to mechanically refrigerate the water. In another embodiment, cold air may be blown onto the pot as it spins to cool the liquid. In yet another embodiment, there may be a heat reclaim system where there is a source of cold water injected into the sink bowl and as it absorbs heat from the round spinning pot, the heated water is sent to another source that can use the higher temp water, such as a dish washer or water heater. Further, an additive such as food grade salt may be added to the water to enhance the speed of heat absorption.

In yet another embodiment, the spinning mechanism could be made as a series of rollers and the round pot could be a sealed pot that sits horizontally. The rollers could spin the pot like a wheel, and thus achieve the heat transfer results similar to the pot sitting vertically.

Comparative cooling tests were performed using a liquid cooked food (i.e. soup) and a semi-liquid cooked food (i.e. chili). The cooling tests were performed using a 0° C. ambient temperature ice bath, a 3° C. ambient air temperature refrigerator, and the currently claimed invention. The tests were performed in both types of cooked food (i.e. liquid and semiliquid). The food was heated up to 60° C.-77° C. (140-171° F.). Then, the temperature of the cooked food was lowered using an ice bath, a refrigerator and the currently claimed food chilling apparatus in an ice bath, separately. The temperature was monitored and recorded every 5 minutes until temperature reached equilibrium.

FIG. 9 illustrates a comparison of the cooling profiles obtained for a liquid cooked food, such as soup, using an ice bath, refrigerator, and the currently claimed invention, each separately. As shown, it took approximately 200 minutes and approximately 110 minutes to bring down the temperature of the cooked food to 40° C. using an ice bath and refrigerator, respectively. Whereas, it only took approximately 35 minutes to bring down the temperature of the liquid cooked food to 40° C. using the currently claimed food chilling apparatus.

Figure 10:
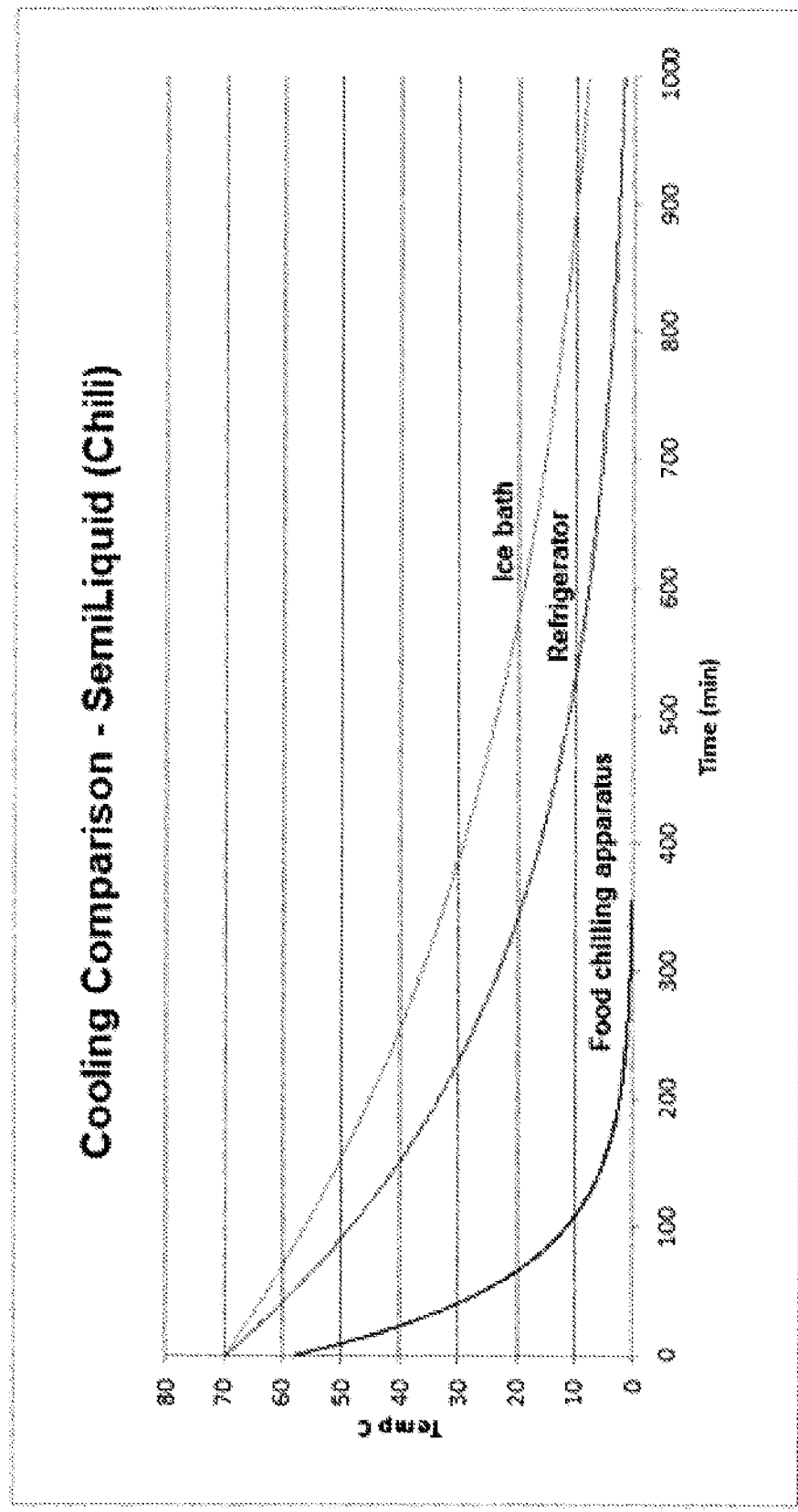
FIG. 10 illustrates cooling comparison tests for a semi-liquid food.

FIG. 10 illustrates a comparison of the cooling profiles obtained for a semiliquid cooked food, such as chili, using an ice bath, refrigeration and the currently claimed invention, each separately. As shown, it took approximately 275 minutes and approximately 175 minutes to bring down the temperature of the cooked food to 40° C. using an ice bath and refrigerator, respectively. Whereas, it only took approximately 35 minutes to bring down the temperature of the cooked food to 40° C. using the currently claimed food chilling apparatus.

As shown in both comparative cooling tests, the currently claimed invention provides for a decrease in temperature in a fraction of the time compared to currently available methods. The currently claimed invention provides for a decrease in temperature of a cooked food in ⅔ of the time compared to an ice bath and/or refrigerator.

What is claimed is:

1. A food chilling apparatus, comprising:
    a stand portion, a base portion, a pot portion, and a sink portion,
        the stand portion comprising a motor, an attachment portion, and a vertical structural member, where a paddle portion is attached to the attachment portion;
        the base portion comprising a baseplate, an output shaft, and a cradle, wherein the pot portion is removably attached to the cradle, and the paddle portion extends into the pot portion;
        the paddle portion comprising at least two arms extending into the pot portion;
        the sink portion capable of containing a liquid with ice;
        wherein the output shaft is capable of rotating the cradle and the pot portion, and the paddle portion stays stationary relative to the rotation of the pot portion,
        wherein the stand portion, base portion, and pot portion are at least partially inside the sink portion, the base portion and the cradle being completely submerged in the liquid with ice.

2. The food chilling apparatus of claim 1, wherein the liquid has a temperature of less than 50° F.

3. The food chilling apparatus of claim 1, wherein the output shaft rotates on a rotational axis approximately perpendicular to the baseplate.

4. The food chilling apparatus of claim 1, wherein the cradle further comprises at least three arms, each arm including at least two grip portions made of a material capable of gripping the pot portion.

5. The food chilling apparatus of claim 1, wherein the pot portion is capable of precession around a fixed rotational axis.

6. The food chilling apparatus of claim 1, wherein the paddle portion is removably attached to the attachment portion.

7. A food chilling apparatus, comprising:
    a stand portion, a base portion, a pot portion, and a sink portion,
        the stand portion comprising a motor, an attachment portion, and a vertical structural member, where a paddle portion is attached to the attachment portion,
        the base portion comprising a baseplate, an output shaft, and a cradle,
        the sink portion capable of containing a liquid with ice,
        the paddle portion comprising at least two arms extending into the pot portion,
        wherein the pot portion is removably attached to the cradle, and the paddle portion extends into the pot portion;
        wherein the output shaft is capable of displacing the cradle and the pot portion, and the motor is located on one end of the vertical structural member;
        wherein the stand portion, base portion, and pot portion are at least partially inside the sink portion, the base portion and the cradle being completely submerged in the liquid with ice.

8. The food chilling apparatus of claim 7, wherein the output shaft is capable of displacing the cradle in a motion around a constant rotational axis.

9. The food chilling apparatus of claim 7, wherein the output shaft is capable of displacing the cradle in a vibratory motion.

10. The food chilling apparatus of claim 7, wherein the output shaft is capable of precession around a constant rotational axis.

11. The food chilling apparatus of claim 7, where the paddle portion is capable of rotating around a rotational axis.

12. The food chilling apparatus of claim 7, where the pot portion is cylindrically shaped.

13. The food chilling apparatus of claim 7, where the paddle portion further comprises a flexible material.

* * * * *